United States Patent [19]

Purdue

[11] Patent Number: 4,668,249
[45] Date of Patent: May 26, 1987

[54] DEHUMIDIFICATION METHOD AND APPARATUS

[76] Inventor: John C. Purdue, P.O. Box 218, Toledo, Ohio 43603

[21] Appl. No.: 513,446

[22] Filed: Jul. 13, 1983

[51] Int. Cl.[4] .............................................. B01D 53/28
[52] U.S. Cl. .......................................... 55/33; 55/34; 55/181; 55/208; 55/390
[58] Field of Search ...................... 55/32–34, 55/60, 78, 181, 208, 390

[56] References Cited

U.S. PATENT DOCUMENTS

| | | | |
|---|---|---|---|
| 2,328,974 | 9/1943 | Guler | 55/34 X |
| 3,009,540 | 11/1961 | Munters | 55/78 X |
| 3,470,708 | 10/1969 | Weil et al. | 55/34 X |
| 3,774,374 | 11/1973 | Dufour et al. | 55/34 X |
| 3,844,737 | 10/1974 | Macriss et al. | 55/34 |
| 3,889,742 | 6/1975 | Rush et al. | 55/390 X |
| 3,925,021 | 12/1975 | Yoshino et al. | 55/278 X |
| 4,012,206 | 3/1977 | Macriss et al. | 55/34 |
| 4,040,804 | 8/1977 | Harrison | 55/33 X |
| 4,134,743 | 1/1979 | Macriss et al. | 55/34 |
| 4,200,441 | 4/1980 | Honmann et al. | 55/181 |
| 4,341,539 | 7/1982 | Gidaspow et al. | 55/208 X |
| 4,380,458 | 4/1983 | Callihan | 55/33 |
| 4,391,616 | 7/1983 | Imamura | 55/34 X |

Primary Examiner—Robert Spitzer
Attorney, Agent, or Firm—John C. Purdue

[57] ABSTRACT

Dehumidification apparatus is disclosed, as is a dehumidification method. The apparatus comprises a material, for example a laminate which is commercially available under the trade designation "Sanwet Sheet 4000", which is operable to remove water vapor from air circulated in contact therewith without releasing the latent heat of vaporization of the water removed, means for circulating air to be delivered to a space to be conditioned in contact with the material, means for circulating regenerating air in contact with the material, and means for heating circulated regenerating air before it contacts the material. The method comprises circulating air to be dehumidified in contact with such a material, interrupting the circulation of air to be dehumidified in contact with the material, circulating heated regenerating air in contact with the material, separating the heated air and water released thereto from the material and carrying out the foregoing steps repeatedly.

5 Claims, 6 Drawing Figures

DEHUMIDIFICATION METHOD AND APPARATUS

BACKGROUND OF THE INVENTION

1. Field of the Invention

This invention relates to a method for the dehumidification of air and to apparatus useful in practicing the method. Specifically, a super-absorbent polymer or another material which is capable of removing water vapor from air without releasing the latent heat of vaporization of the water vapor removed is employed for dehumidification. Examples of super-absorbent polymers that can be used for dehumidification according to the instant invention include lightly cross-linked hydrophillic polymers disclosed in U.S. Pat. No. 4,293,609 and in patents cited therein as disclosing such polymers and starch/acrylic graft copolymers disclosed in U.S. Pat. Nos. 4,338,371, 4,076,663, 4,055,184, 3,997,484, 3,661,815 and 3,425,971.

2. The Prior Art

Humidity control is an important part of heating, ventilating and air conditioning. In cold climates it is desirable to add moisture during the heating season and, in most parts of the United States, it is desirable to remove moisture whenever there is hot, humid weather. Some industries require both humidity and temperature to be controlled within relatively narrow limits whenever certain processes are being practiced; this may involve humidification or dehumidification and heating or cooling. Moisture vapor has been removed from air by contact with a cooled coil or with cold water, and also has been removed by chemical dehumidification, for example by contact with alumina, silica gel, an ethylene glycol solution or a lithium chloride solution.

When air is dehumidified by contact with a chilled coil, sensible heat is removed from the air until it becomes saturated with moisture vapor and, as the air is cooled further, both sensible and latent heat are removed; the result is air essentially saturated with water vapor. Many people find buildings air conditioned in this way uncomfortable, frequently characterizing them as "clammy"; further, in many instances, the limiting condition which determines the energy requirements of systems which dehumidify in this way is the energy requirement for dehumidification, because that amount of energy provides more sensible cooling than is required for comfort. In such cases, more effective insulation of the space being conditioned does not reduce the energy requirements for air conditioning because the same amount of energy is still required to accomplish dehumidification.

Chemical dehumidification can be used to provide air at any moisture level required for air conditioning, and independently of temperature. However, chemical dehumidification as presently practiced involves the evolution of heat in an amount equal to the latent heat of vaporization of the moisture removed from the air, so that sensible cooling is required both to remove the latent heat of vaporization of the water vapor removed and to lower the air temperature below ambient the amount required for temperature control. In addition, chemical dehumidification requires energy to regenerate the desiccant, i.e., alumina, silica gel, ethylene glycol or lithium chloride, and frequently requires sufficiently close control to necessitate an operator.

THE INSTANT INVENTION

The present invention is based upon the discovery that a starch/acrylic graft copolymer can be used to dehumidify air without releasing the latent heat of vaporization of the moisture removed. It is hypothesized that the moisture removed from air circulating in contact therewith is loosely held in the vapor phase on the surface of the polymer. In any event, whatever the mechanism, the moisture removed can later be released by circulating air at a comparatively low temperature in contact therewith to "regenerate" the polymer as a desiccant, preparing it for use to separate additional water vapor from air to be conditioned. Since the heat of vaporization is not released, dehumidification can be carried in out in or adjacent the space to be conditioned without the necessity for eliminating the heat that would be associated with such use of previously known chemical dehumidification and without the need for disposing of condensate, as would be required if a chilled coil were used for such dehumidification. In addition, such dehumidification requires less energy than does any of the previously-mentioned chemical desiccants, and the comparatively low temperature that is required for regeneration is readily achievable from solar energy.

BRIEF DESCRIPTION OF THE DRAWINGS

FIG. 6 is a view in horizontal section showing a third embodiment of dehumidification apparatus according to the invention.

DESCRIPTION OF THE PREFERRED EMBODIMENTS

Figure 1:
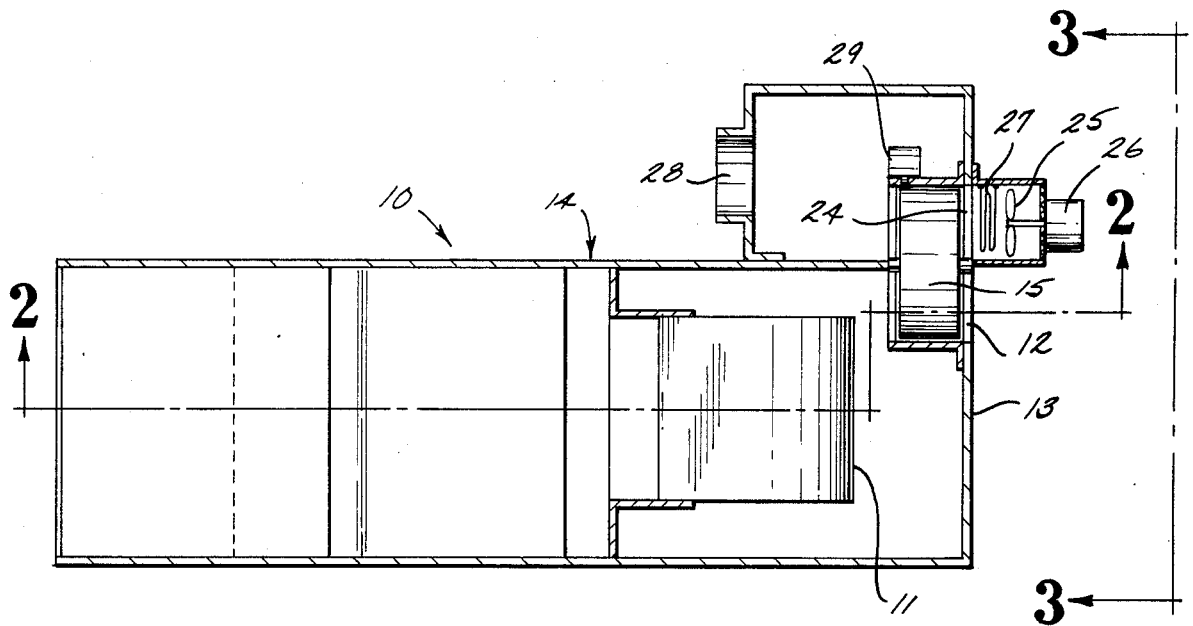
FIG. 1 is a horizontal sectional view showing dehumidification apparatus according to the invention.

The following example demonstrates the operability of a particular starch/acrylic graft copolymer to dehumidify air without release of the latent heat of vaporization of the moisture vapor removed from the dehumidified air. The example is to be construed as illustrating the invention and not in any way as limiting.

EXAMPLE

A four foot length of circular duct 1.2 meters long and 15 millimeters in diameter, and fitted at one end with an exhaust fan powered by an electric motor was packed with a laminate of a starch/acrylic graft copolymer on a cellulosic sheet material. The laminate was substantially 30 centimeters wide and 15 meters long; the laminate weighed 410 grams; the starch/acrylic graft copolymer on the laminate weighed 43 grams per square meter of laminate. The fan had a capacity, when the duct was unobstructed, of about eight cubic meters per minute. The specific laminate used is one which is commercially available from Sanyo Chemical Industries, Ltd., Kyato, Japan, under the trade designation "Sanwet Sheet 4000". The starch/acrylic graft copolymer of the laminate is one which is commercially available from Sanyo Chemical Industries, Ltd., under the trade designation "Sanwet IM 1000". The production of the starch/acrylic graft copolymer is disclosed in U.S. Pat. No. 4,076,663.

The duct was then placed in a damp basement, dry bulb temperature 73° F. and wet bulb temperature 68° F., corresponding to a specific humidity of substantially 94 grains of water vapor per pound of dry air. The fan was then energized to draw air from the basement into the duct and, after circulation through the laminate therein, to discharge the circulated air back to the basement. The apparatus was operated in this manner for dehumidification for a little over three hours, after which time the laminate was "regenerated".

For regeneration, the fan in the duct was energized, with the duct directed to discharge effluent therefrom to the outdoors, while a hand held blower was used to direct air over a resistance heater and into the end of the duct opposite the fan at a rate of about one cubic meter per minute. The resistance heater was energized to heat the air from the hand held blower to a temperature of about 65° C.

During the first dehumidification cycle, described above, two determinations of wet bulb and dry bulb temperatures in the basement were made, a first after two hours and forty five minutes and a second after three hours and 20 minutes. A wet bulb temperature of 65° F. was measured both times, but the dry bulb temperature was 73° F. on the first measurement and 72° F. on the second measurement, indicating specific humidities of 80 and 82 grains of water vapor per pound of dry air, respectively.

The dehumidification and regeneration cycles were then carried out repeatedly over a total of about 72 hours. During the succeeding dehumidification cycles, wet bulb temperature in the basement was found to range from 63° F. to 65° F.; dry bulb temperature was found to range from 70° F. to 73½° F.; and specific humidity was found to range from 74 to 82 grains of water vapor per pound of dry air.

In order to confirm that dehumidification was accomplished without release of the latent heat of the water vapor removed from the air, the dry bulb temperature of air entering the duct and of the air between the laminate and the fan were measured, with the fan running. It was found that (at equilibrium after the heat retained by the laminate after regeneration had been rejected) the air entering the duct was consistently ½ degree C. cooler than the air between the laminate and the fan both when the laminate was removing moisture from air circulated in contact with it and when it was saturated and, therefore, not removing moisture. After the first cycle of dehumidification, the laminate was found to weigh the same, i.e., 410 grams, as before dehumidification was commenced. The reason for this is not understood, as it is clear from the data presented above that moisture vapor was removed during this cycle. The possibility is suggested that air was entrained on the surface of the laminate before dehumidification was commenced, and that the water vapor removed from the air during dehumidification replaced an equal weight of the entrained air. After the first cycle of regeneration, the laminate was found to weigh 396 grams. Thereafter, the weight gain during dehumidification cycles was found to range from 40 to 60 grams, with corresponding weight losses during successive cycles of regeneration.

The first dehumidification cycle was continued for 3 hours and 40 minutes, while subsequent cycles were continued for periods of time ranging from 4½ hours to 21 hours. There was, however, no correlation between the length of the dehumidification cycle and the weight gain of the laminate during that cycle. It will be appreciated, therefore, that shorter dehumidification cycles and more frequent regeneration are indicated for an increased rate of moisture vapor removal and lower specific humidities.

Figure 2:
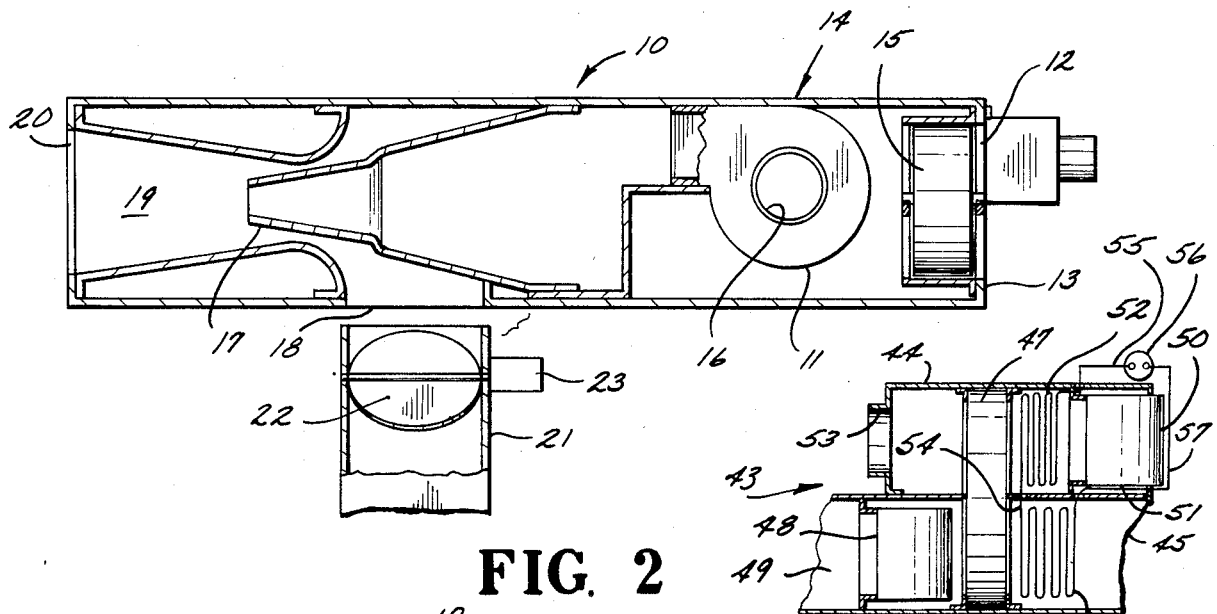
FIG. 2 is a vertical sectional view of the apparatus taken along the line 2—2 of FIG. 1.
Figure 3:
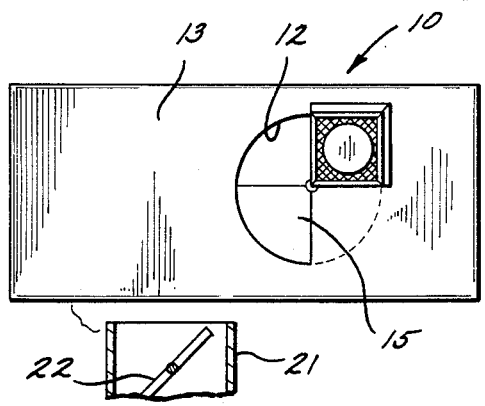
FIG. 3 is an end view of the apparatus taken as indicated by line 3—3 of FIG. 1.

Referring now in more detail to the drawings and, in particular, to FIGS. 1-3, a combined mixing box and dehumidifier according to the invention is indicated generally at 10. As best seen in FIG. 2, the mixing box and dehumidifier 10 includes a blower 11 which draws air through an opening 12 in a back 13 of a housing 14 and two segments of a dehumidification wheel 15 to the inlet 16 of the blower 11. The mixing box and dehumidifier 10 also includes induction nozzles 17 through which air discharged from the blower 11 flows to induce a flow of air through an inlet 18. Air which is induced to flow through the inlet 18 is mixed with air discharged from the induction nozzles 17 in a mixing section 19 of the mixing box and dehumidifier 10 before being discharged from an outlet 20 and delivered to a space to be air conditioned.

Air which is induced to flow into the mixing box and dehumidifier 10 through the inlet 18 is a mixture of primary conditioned air delivered adjacent the opening 18 from a duct 21 at a rate which is determined by the setting of a damper 22 controlled by a motor controller 23. The controller 23 is operated in response to a signal from a control circuit (not illustrated) to maintain a desired comfort condition within a space served by the mixing box and dehumidifier 10. As the damper 22 is throttled, air is induced to flow through the inlet 18 from a plenum within which the mixing box and dehumidifier 10 is located. The rate at which air from the plenum is induced to flow through the inlet 18 increases as the damper 22 is closed, and vice versa.

The dehumidifying wheel 15 is packed with a pervious mass, for example, the laminate identified above, of a material which is capable of dehumidifying air without releasing the latent heat of the moisture vapor removed therefrom. The wheel 15 is segmented (see, in particular, FIGS. 3 and 4) into four quadrants, each extending longitudinally thereof, to minimize lateral flow of air as it passes through the wheel 15. As shown in FIG. 3, two of the quadrants are aligned with the opening 12 so that the blower 11 draws air therethrough while a third of the segments is aligned with an opening 24 (see FIG. 1) in the back wall 13 of the mixing box and dehumidifier 10. A fan 25 driven by a motor 26 circulates air over a heater 27, through the opening 24 and the aligned segments of the wheel 15 for regeneration of the desiccant therein. The regenerating air is discharged from the wheel 15 through an outlet 28 and is vented to the atmosphere in any suitable manner, not illustrated.

The wheel 15 is rotated at a slow rate, for example, about three revolutions per hour, by a motor 29 so that successive portions of the wheel are regenerated and, after regeneration, are advanced into alignment with the opening 12 for dehumidification of air drawn therethrough into the mixing box and dehumidifier 10 by the blower 11.

Figures 4, 5:
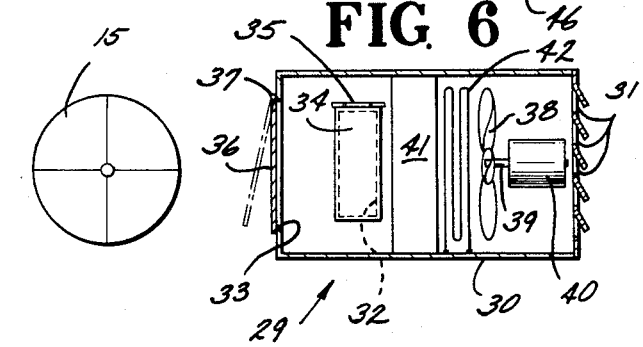
FIG. 4 is a view in elevation of a dehumidifying wheel which is a part of the apparatus of FIGS. 1-3.
FIG. 5 is a vertical, sectional view showing a second embodiment of dehumidification apparatus according to the invention.

Another embodiment of dehumidification apparatus according to the instant invention is indicated generally at 29 in FIG. 5. The apparatus 29 comprises a casing 30 having openings 31 in the front wall thereof, an opening 32 in a side wall thereof and an opening 33 in a rear wall thereof. A damper 34 is pinned, as indicated at 35, to the interior of the casing 30 over the opening 32, while a damper 36 is pinned, as indicated at 37, to the exterior of the casing 30 over the opening 33. A fan 38 is carried on the shaft 39 of a reversible motor 40, which is mounted in any suitable manner (not illustrated) inside the casing 30.

In operation of the dehumidification apparatus 29, when a desiccant 41, which is the previously described laminate or another material that is capable of dehumidifying air without releasing the latent heat of vaporization of the moisture removed, is regenerated, the motor 40 is operated to rotate the fan 38 to cause a movement of air from left to right in FIG. 5. This air movement urges the damper 36 to the closed position shown in solid lines and, simultaneously, urges the damper 34 to swing inwardly at the bottom so that it does not prevent the flow of air through the opening 32. The dehumidifier 29 can extend through a window or other wall opening so that the casing opening 32 is on the interior of the wall while the opening 33 is on the exterior thereof. The air flow, then, caused by the fan 38 is a recirculation of room air through the desiccant 41 and through the openings 31 back to the room. Whenever required, the desiccant 41 can be regenerated by reversing the motor 40 and energizing a resistance heater 42. Air then flows from right to left, entering through the openings 31, flowing over the resistance heater 42 and through the desiccant 41 to the left of the casing 30. This air flow forces the damper 34 to a closed position, but forces the damper 36 to an open position, for example that shown in broken lines, so that hot, humid regenerating air is discharged through the opening 33. When the desiccant 41 has been regenerated, the resistance heater 42 can advantageously be deenergized a few minutes before the motor 40 is reversed, so that residual heat in the desiccant 41 is rejected to the exterior of the dehumidifier 29 through the opening 33.

A third embodiment of dehumidification apparatus according to the instant invention is indicated generally at 43 in FIG. 6. The apparatus 43 comprises a casing 44 which forms two separate passages through which air is circulated, a first into the apparatus through an end 45 which is connected in any suitable manner (not illustrated) to the exterior to receive ambient air, and from thence in contact with an evaporator 46, through a wheel 47 where it contacts the previously described laminate or another suitable desiccant, into the inlet of a blower 48, and from an end 49 of the apparatus for further conditioning before it is delivered to a zone (not illustrated) to be conditioned. The second flow path for air through the apparatus 43 is through an opening 50 to the inlet of a blower 51, in thermal contact with a condensor 52, through the dehumidification wheel 47 and through an outlet 53 from which is vented to atmosphere in any suitable manner (not illustrated). The evaporator 46 and the condensor 52 are operably connected by a line 54, while the condensor 52 is connected by a line 55 to a compressor 56, and the compressor 56 is, in turn, connected by a line 57 to the evaporator 46.

In operation of the apparatus 43, both of the blowers 48 and 51 are energized to cause air flow in both of the paths, the dehumidifying wheel 47 is rotated in any suitable manner (not illustrated), for example at about three revolutions per hour, and the refrigeration apparatus comprising the evaporator 46, the condensor 52 and the compressor 56 is operated so that air which contacts the evaporator 56 is cooled to about 30° C. before it enters the wheel 43 for dehumidification, while regenerating air which contacts the condensor 52 is heated to about 130° F. before it enters the wheel 43 for regeneration of the desiccant therein.

While the best modes presently contemplated by the inventor have been described above with reference to the attached drawings, it will be appreciated that various changes and modifications can be made without departing from the spirit and scope of the invention as defined in the appended claims. For example, other starch/acrylic graft copolymers, for example those disclosed in U.S. Pat. Nos. 4,338,371, 4,055,184, 3,997,484, 3,661,815 and 3,425,917, can be substituted for that specifically described above, as can the lightly cross-linked hydrophillic polymers disclosed in U.S. Pat. No. 4,293,609 and in patents cited therein as disclosing such polymers, and other materials which are capable of removing water vapor from air without releasing the latent heat of vaporization of the water vapor removed. Examples of other operable materials are laminates available under the designations Water Lock A100 and DWAL from Grain Processing Corp., Muscatine, Iowa and The Dow Chemical Co., Midland, Mich.

What is claimed is:

1. A dehumidification method which comprises (1) circulating air to be dehumidified in contact with a material which is operable to remove water vapor from the circulated air without releasing the latent heat of vaporization of the removed water, and from the material to a space to be conditioned, (2) interrupting the circulation of air to be dehumidified in contact with the material, (3) circulating in contact with the material air that has been heated to a temperature sufficiently high to cause the material to release to the heated air water in the vapor phase that has been removed by the material from air previously circulated in contact therewith and to the space to be conditioned, (4) separating the heated air and water vapor released thereto from the material and (5) carrying out the foregoing steps (1) through (4) repeatedly.

2. A dehumidification method as claimed in claim 1 wherein air to be dehumidified is circulated in a first flow path in contact with a first body of a material which is operable to remove water vapor from the circulated air without releasing the latent heat of vaporization of the removed water while air that has been heated to a temperature sufficiently high is circulated in a second flow path in contact with a second body of the material to cause release thereto of water in the vapor phase, and repeatedly moving the first and second bodies of the material between the first and the second flow paths so that each alternately removes water from air circulated in the first flow path and releases water to air circulated in the second flow path.

3. A dehumidification method as claimed in claim 1 wherein the circulation of air to be dehumidified is interrupted by stopping the air flow periodically and heated air is circulated while the flow of air to be dehumidified is interrupted.

4. A dehumidification method as claimed in claim 3 wherein air to be dehumidified and heated air are circulated in opposite directions.

5. Dehumidification apparatus comprising, in combination, a material which is operable to remove water vapor from air circulated in contact therewith without releasing the latent heat of vaporization of the water removed, means for circulating air to be delivered to a space to be conditioned in contact with said material, means for circulating regenerating air in contact with said material, and means for heating circulated regenerating air before it contacts said material.

* * * * *